United States Patent [19]
Smolik et al.

[11] Patent Number: 5,562,835
[45] Date of Patent: Oct. 8, 1996

[54] PROCESS FOR REDUCING THE POPULATION OF BACTERIA IN CONTAMINATED AQUEOUS SYSTEMS

[75] Inventors: Nancy A. Smolik, Staten Island, N.Y.; Linda H. Rusznak, Bayonne; Dale A. Jenson, Long Valley, both of N.J.

[73] Assignee: Ashland Inc., Columbus, Ohio

[21] Appl. No.: 399,691

[22] Filed: Feb. 27, 1995

Related U.S. Application Data

[63] Continuation-in-part of Ser. No. 160,004, Nov. 30, 1993, abandoned.

[51] Int. Cl.$^6$ ..................................................... C02F 1/50
[52] U.S. Cl. ......................... 210/755; 162/161; 210/764; 422/37; 514/626
[58] Field of Search ........................... 162/161; 210/754, 210/755, 764; 424/661; 422/37; 514/626

[56] References Cited

U.S. PATENT DOCUMENTS

| | | | |
|---|---|---|---|
| 4,295,932 | 10/1991 | Pocius | 162/161 |
| 4,554,367 | 11/1985 | Wehner et al. | 71/86 |
| 4,959,157 | 9/1990 | Karbowski | 210/752 |
| 4,966,775 | 10/1990 | Donofrio et al. | 424/661 |
| 4,975,109 | 12/1990 | Friedman et al. | 210/755 |
| 5,324,432 | 6/1994 | Robertson et al. | 210/764 |

OTHER PUBLICATIONS

Recirculating Water Cooling Towers, Dow Product Literature for Antimicrobials 7287 and 8536.

*Primary Examiner*—Peter A. Hruskoci
*Attorney, Agent, or Firm*—David L. Hedden

[57] ABSTRACT

This invention relates to a process for reducing the population of bacteria in aqueous systems which comprises co-treating said aqueous system with 2,2-dibromo-3-nitrilopropionamide and chlorine dioxide under the conditions specified herein. By co-treating an aqueous system with both 2,2-dibromo-3-nitrilopropionamide and chlorine dioxide, one can achieve a more effective biocidal effect with the same amount of biocide than if either the 2,2-dibromo-3-nitrilopropionamide or chlorine dioxide are used separately.

7 Claims, No Drawings

PROCESS FOR REDUCING THE POPULATION OF BACTERIA IN CONTAMINATED AQUEOUS SYSTEMS

CROSS REFERENCE TO RELATED APPLICATION

This application is a continuation-in-part of U.S. application Ser. No. 08/160,004 filed on Nov. 30, 1993, now abandoned.

FIELD OF THE INVENTION

This invention relates to a process for reducing the population of bacteria in aqueous systems which comprises co-treating said aqueous system with 2,2-dibromo-3-nitrilopropionamide and chlorine dioxide under the conditions specified herein. By co-treating an aqueous system with both 2,2-dibromo-3-nitrilopropionamide and chlorine dioxide, one can achieve a more effective biocidal effect with the same amount of biocide than if either the 2,2-dibromo-3-nitrilopropionamide or chlorine dioxide are used separately.

BACKGROUND OF THE INVENTION

Bacterial contamination is found in many aqueous systems, for example natural waters, pools, and industrial systems such as cooling water systems, air washer systems, and pulp and paper mill systems. The presence of such bacteria can cause slime which can foul, plug, or corrode the various components of the system and may result in unhealthy water. Contaminated cooling water may reduce the efficiency of cooling systems while contaminated water in pulp and paper systems may effect the production and overall quality of finished paper.

It is known that chlorine dioxide can be used to reduce the bacteria in contaminated aqueous systems. It is also known that 2,2-dibromo-3-nitrilopropionamide can be used to reduce the bacteria in contaminated aqueous systems. Dow Chemical product literature states that the use of chlorine and 2,2-dibromo-3-nitrilopropionamide in aqueous systems produces synergistic results, but does not teach or suggest the use of chlorine dioxide with 2,2-dibromo-3-nitrilopropionamide to reduce the level of bacteria in contaminated aqueous systems.

SUMMARY OF THE INVENTION

This invention relates to a process for reducing the population of bacteria in a contaminated aqueous system which comprises co-treating said aqueous system with 2,2-dibromo-3-nitrilopropionamide and chlorine dioxide such that the weight ratio of 2,2-dibromo-3-nitrilopropionamide to chlorine dioxide of about 1:1 to about 1:5. Preferably, the 2,2-dibromo-3-nitrilopropionamide and the chlorine dioxide are added sequentially to the aqueous system without regard to whether the 2,2-dibromo-3-nitrilopropionamide or the chlorine dioxide is added first.

As the data will show, the addition of the 2,2-dibromo-3-nitrilopropionamide and chlorine dioxide reduces the population of the bacteria in the contaminated aqueous system by amounts which could not have been predicted by looking at the effect of the using either 2,2-dibromo-3-nitrilopropionamide or chlorine dioxide alone.

By co-treating an aqueous system with both 2,2-dibromo-3-nitrilopropionamide and chlorine dioxide, one can achieve a more effective biocidal effect with the same amount of biocide than if either the 2,2-dibromo-3-nitrilopropionamide or chlorine dioxide are used separately. Consequently, it possible to use decreased concentrations of 2,2-dibromo-3-nitrilopropionamide and chlorine dioxide and still achieve the same biocidal effectiveness if the contaminated aqueous system is co-treated with 2,2-dibromo-3-nitrilopropionamide and chlorine dioxide instead of using 2,2-dibromo-3-nitrilopropionamide and chlorine dioxide separately. This is particularly significant with respect to 2,2-dibromo-3-nitrilopropionamide which can have more detrimental effects on the environment than chlorine dioxide if used in higher concentrations.

The process is particularly effective for treating contaminated aqueous systems having a pH of at least 7.8.

BEST MODE AND ENABLING DISCLOSURE

For purposes of describing this invention, a contaminated aqueous system is an aqueous system which contains bacteria. The object of the invention is to reduce or eliminate the population of bacteria in the contaminated aqueous system.

As used herein, co-treatment of the contaminated aqueous system means that both 2,2-dibromo-3-nitrilopropionamide and chlorine dioxide must be added to the contaminated aqueous system. The addition can be simultaneous or preferably sequentially without regard to whether the 2,2-dibromo-3-nitrilopropionamide or the chlorine dioxide is added first.

The weight ratio of 2,2-dibromo-3-nitrilopropionamide to chlorine dioxide will vary somewhat depending upon the bacterial contamination of the aqueous system. Generally, the weight ratio of 2,2-dibromo-3-nitrilopropionamide to chlorine dioxide will range from 1:4 to 1:20, preferably 1:10 to 1:20.

The total amount of 2,2-dibromo-3-nitrilopropionamide and chlorine dioxide combined used to treat a contaminated aqueous system is a concentration effective to inhibit the growth of bacteria in the aqueous system. Generally, this is in amount of 0.1 ppm to 25.0 ppm, preferably 0.1 ppm to 10.0 ppm, most preferably 0.1 ppm to 5.0 ppm, based upon the total amount of contaminated aqueous system to be treated. Amounts will vary depending upon the amount of bacteria in the aqueous system to be treated.

In the sequential co-treatment process, either the 2,2-dibromo-3-nitrilopropionamide or the chlorine dioxide can be added first with the other compound added second. When the 2,2-dibromo-3-nitrilopropionamide and chlorine dioxide are added sequentially, they are usually added within seconds.

The compositions are particularly effective in contaminated aqueous systems having an alkaline pH above 7.8.

EXAMPLES

Controls are designated by the abbreviation "CNTR". They show the amount of bacterial contamination in the untreated samples. Treated samples show the effectiveness of chlorine dioxide alone, and 2,2-dibromo-3-nitrilopropionamide alone.

The examples within the scope of this invention show the effectiveness of 2,2-dibromo-3-nitrilopropionamide in conjunction with the chlorine dioxide in the co-treatment process at various concentrations and at a pH ranging from 7.6 to 8.7.

In order to determine the effectiveness of the co-treatment process in a cooling water system, a Relative Population Density Test (R.P.D.) is performed. This test essentially measures the number of bacteria present before and after the co-treatment process. By using this procedure, the effectiveness of the co-treatment process using different concentrations of 2,2-dibromo-3-nitrilopropionamide and chlorine dioxide on a single water sample can be examined.

The actual procedure simulates a cooling tower in that a known volume of cooling water is treated with known volumes of 2,2-dibromo-3-nitrilopropionamide and chlorine dioxide. Treated samples are then agitated on a rotary shaker for a 24-hour contact period. Each sample is then plated out in order to determine which treatment process exhibited the greatest percent reduction in bacteria.

The actual procedure is as follows:
1. A known aliquot of an aqueous test sample containing bacteria is measured into each of a number of clean, dry culture flasks (40 ml. is a convenient amount).
2. A specific amount of biocidal composition is added to obtain a known ppm concentration of biocides in the sample. Normally, cooling water biocides are tested at concentrations of 25 ppm and 50 ppm. For chlorine dioxide, tested concentrations are based upon the demand of the tested system. A lambda pipette is used to deliver these small quantities. In 40 ml. of sample, 25 ppm is equal to 1 microliter.

$$\frac{25}{1,000,000} = \frac{X}{40}$$

In a 40 ml sample, 50 ppm equals 2 microliters.
3. An aliquot of alkaline water samples contaminated with various bacteria are added to flasks which are dosed with different concentrations of biocides. Untreated control samples and the treated flasks are placed on a rotary shaker and agitated at 37° for 24 hours.
4. Each sample is the plated according to the Standard Plate Count Method utilizing tryptone glucose extract agar as the growth medium.
5. The plates are incubated at 37° C. for 48 hours and are then counted and the results recorded. The percent reduction is computed as follows:

$$\% \text{ reduction} = \frac{A - B}{A} \times 100$$

where A is the average of the two control counts expressed in colony forming units and B is the total count of the treated flask expressed in colony forming units.

The results of testing are shown in Tables I to IV which follow. The abbreviations are as follows:

BC = biocide composition.
CFU/mL = colony forming units per mL.
$ClO_2$ = chlorine dioxide.
CNTR = not co-treated with 2,2-dibromo-3-nitrilopropionamide and chlorine dioxide. CNTR/$ClO_2$ is a control where the aqueous system was treated with $ClO_2$, but not DBNPA. CNTR/DBNPA is a control where the aqueous system was treated with DBNPA, but not $ClO_2$. All controls are designated by letters while examples within the scope of the invention are designated by numbers.
DBNPA = 2,2 dibromo-3-nitrilopropionamide as 5% active solution in water.
PPM = parts per million of biocide composition based upon the aqueous system treated.
% RED = percent reduction in bacteria after treatment.

Note that all controls are designated by letters and all examples within the claims are designated by numbers.

TABLE I

| BC | PPM | CFU/ML | % RED |
|---|---|---|---|
| (aqueous system at a pH = 7.2) | | | |
| CNTR | | 28,100 | |
| A | | | |
| CNTR/$ClO_2$ | | | |
| B | 0.5 | 23,000 | 17.9 |
| C | 1.0 | 6,800 | 75.4 |
| CNTR/DBNPA | | | |
| D | 0.5 | 60 | 99.8 |
| E | 1.0 | | >99.9 |
| DBNPA/$ClO_2$ | | | |
| F | 0.1/0.5 | 50 | 99.8 |
| G | 0.5/0.1 | 140 | 99.5 |
| H | 0.5/0.5 | | >99.9 |
| I | 1/0.5 | | 99.9 |

The data (Examples A–E) in Table I all represent controls. They are submitted for comparison purposes only. These data show that the co-treatment of a contaminated aqueous system, having a pH of 7.2, with DBNPA/$ClO_2$ does not result in any increased biocidal effectiveness than if the system is treated with DBNPA alone. In other words, no extra biocidal effect is shown by co-treatment DBNPA/$ClO_2$ at a pH of 7.2.

TABLE II

| BC | PPM | CFU/ML | % RED |
|---|---|---|---|
| (aqueous system at a pH = 7.6) | | | |
| CNTR | | 39,000 | |
| J | | | |
| CNTR/$ClO_2$ | | | |
| K | 0.5 | 14,000 | 64.1 |
| L | 1.0 | 8,000 | 79.5 |
| CNTR/DBNPA | | | |
| M | 0.5 | 33,000 | 15.4 |
| N | 1.0 | 15,000 | 61.5 |
| DBNPA/$ClO_2$ | | | |
| O | 0.1/0.5 | 8,300 | 78.7 |
| P | 0.5/0.1 | 32,000 | 17.9 |
| 1 | 0.5/0.5 | 1,900 | 95.1 |
| 2 | 1/0.5 | 1,200 | 96.9 |

The data in Table II show the improved biocidal effect which results when an aqueous system at a pH of 7.6 is co-treated with DBNPA/$ClO_2$ where the separate concentrations of DBNPA and $ClO_2$ are at least 0.5 ppm and the weight ratio of DBNPA to $ClO_2$ is at least 1:20 based on active solution in water. The Controls show that neither DBNPA or $ClO_2$ alone are as effective at 1.0 ppm when used alone to treat a contaminated aqueous system having a pH of 7.6.

TABLE III

| BC | PPM | CFU/ML | % RED |
|---|---|---|---|
| (aqueous system at a pH = 7.8) | | | |
| CNTR | | | |
| Q | | 880,000 | |

TABLE III-continued

| | (aqueous system at a pH = 7.8) | | |
|---|---|---|---|
| BC | PPM | CFU/ML | % RED |
| R | | 760,000 | |
| CNTR/ClO$_2$ | | | |
| S | 0.10 | 330,000 | 59.8 |
| T | 0.25 | 130,000 | 84.1 |
| U | 0.60 | 82,000 | 90.0 |
| V | 0.75 | 78,000 | 90.5 |
| CNTR/DBNPA | | | |
| W | 0.25 | 790,000 | 3.7 |
| X | 0.50 | 720,000 | 12.2 |
| Y | 0.75 | 81,000 | 90.1 |
| DBNPA/ClO$_2$ | | | |
| Z | 0.25/0.1 | 440,000 | 46.3 |
| AA | 0.5/0.1 | 380,000 | 53.7 |
| BB | 0.25/0.25 | 200,000 | 75.6 |
| 3 | 0.5/0.25 | 60,000 | 92.7 |

The data in Table III show the improved biocidal effect of co-treating an aqueous system at a pH of 7.8 with DBNPA/ClO$_2$ where the total concentration of DBNPA and ClO$_2$ are at least 0.75 ppm and the weight ratio of DBNPA to ClO$_2$ is 1:10 based on active solution in water. The Controls show that neither DBNPA or ClO$_2$ alone are as effective at 0.75 ppm when used alone to treat a contaminated aqueous system having a pH of 7.8.

TABLE IV

| | (aqueous system at a pH = 8.7) | | |
|---|---|---|---|
| BC | PPM | BAC/ML | % RED |
| CNTR | | | |
| CC | | 8,700,000 | |
| DD | | 9,000,000 | |
| CNTR/ClO$_2$ | | | |
| EE | 0.1 | 800,000 | 90.9 |
| FF | 0.5 | 380,000 | 95.7 |
| GG | 1.0 | 180,000 | 97.9 |
| CNTR/DBNPA | | | |
| HH | 0.5 | 8,300,000 | 6.2 |
| II | 1.0 | 16,000 | 99.9 |
| DBNPA/ClO$_2$ | | | |
| 4 | 0.1/0.5 | 12,000 | 99.9 |
| 5 | 0.5/0.1 | 130,000 | 98.5 |
| 6 | 0.5/0.5 | 81,000 | 99.1 |
| 7 | 1/0.5 | 180 | 99.9 |

The data in Table IV show the improved biocidal effect of co-treating an aqueous system at a pH of 8.7 with DBNPA/ClO$_2$. In this example, the improvement is seen in a variety of concentrations of DBNPA/ClO$_2$. In one case the weight ratio of is DBNPA/ClO$_2$ 1:100 based on active solution in water while in another case it is 1:10 base on active solution in water. On the other hand, the Controls show that neither DBNPA or ClO$_2$ alone are as effective at 0.5 ppm as is the combination of DBNPA/ClO$_2$ at a total concentration of 0.6 at a weight ratio of DBNPA/ClO$_2$ 1:100 based on active solution in water.

We claim:

1. A process for reducing the population of bacteria in a contaminated aqueous system having a pH of at least 7.5, which comprises co-treating said aqueous system with 2,2-dibromo-3-nitrilopropionamide and chlorine dioxide, such that weight ratio of 2,2-dibromo-3-nitrilopropionamide to chlorine dioxide is from 1:4 to 1:20, wherein the total amount of 2,2-dibromo-3-nitrilopropionamide and chlorine dioxide added to the aqueous system is at least about 0.6 ppm.

2. The process of claim 1 wherein the 2,2-dibromo-3-nitrilopropionamide and chlorine dioxide are sequentially added to said aqueous system without regard to whether the 2,2-dibromo-3-nitrilopropionamide or the chlorine dioxide is added first.

3. The process of claim 2 wherein the pH of the aqueous system is at least 7.8.

4. The process of claim 3 herein the weight ratio of 2,2-dibromo-3-nitrilopropionamide to chlorine dioxide is from 1:10 to 1:20.

5. The process of claim 4 wherein the total amount of 2,2-dibromo-3-nitrilopropionamide and chlorine dioxide added separately to the aqueous system is from 0.6 ppm to 10 ppm, where said ppm is based upon the total amount of aqueous system to be treated.

6. The process of claim 5 wherein the total amount of 2,2-dibromo-3-nitrilopropionamide and chlorine dioxide added separately to the aqueous system is from 0.6 ppm to 5 ppm, where said ppm is based upon the total amount of aqueous system to be treated.

7. The process of claim 6 wherein the total amount of 2,2-dibromo-3-nitrilopropionamide and chlorine dioxide added to the aqueous system is from 0.6 to 1.0 ppm, where said ppm is based upon the total amount of aqueous system to be treated.

* * * * *